(12) United States Patent
Chikugo (10) Patent No.: US 6,674,088 B2
(45) Date of Patent: Jan. 6, 2004

(54) APPARATUS FOR SCANNING SHEET-LIKE RECORDING MEDIUM

(75) Inventor: Hiroshi Chikugo, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 224 days.

(21) Appl. No.: 09/794,149

(22) Filed: Feb. 28, 2001

(65) Prior Publication Data

US 2001/0017357 A1 Aug. 30, 2001

(30) Foreign Application Priority Data

Feb. 28, 2000 (JP) ........................................ 2000-050962

(51) Int. Cl.$^7$ .............................................. G06K 11/00
(52) U.S. Cl. ........................ 250/556; 250/589; 358/496; 358/498
(58) Field of Search ................................ 250/235, 236, 250/556, 559.3, 581, 582, 584, 585, 586, 589; 358/488, 496, 497, 498; 356/71

(56) References Cited

U.S. PATENT DOCUMENTS 5,689,754 A * 11/1997 Yoshida et al. ................ 399/1
5,736,746 A * 4/1998 Furutoh ...................... 250/589

* cited by examiner

Primary Examiner—Edward J. Glick
Assistant Examiner—Courtney Thomas
(74) Attorney, Agent, or Firm—Sughrue Mion, PLLC (57) ABSTRACT

A reading unit has an auxiliary scanning feed unit for feeding a stimulable phosphor sheet vertically in an auxiliary scanning direction, a scanning light applying unit for applying a laser beam to the stimulable phosphor sheet, a reading assembly for reading radiation image information carried by the stimulable phosphor sheet, a fixed guide unit for holding one surface of the stimulable phosphor sheet, and first and second movable guide units for holding the other surface of the stimulable phosphor sheet, the first and second movable guide units being movable toward and away from the stimulable phosphor sheet. Consequently, the radiation image information recorded on the stimulable phosphor sheet can be read highly accurately and efficiently with a simple arrangement.

12 Claims, 9 Drawing Sheets

APPARATUS FOR SCANNING SHEET-LIKE RECORDING MEDIUM

BACKGROUND OF THE INVENTION

1. Field of the Invention

The present invention relates to an apparatus for scanning a sheet-like recording medium such as a stimulable phosphor sheet to read radiation image information of a subject that is carried thereon.

2. Description of the Related Art

There is known a system for recording radiation image information of a subject such as a human body with a stimulable phosphor, and reproducing the recorded radiation image information on a photosensitive medium such as a photographic film, or displaying the recorded radiation image information on a display device such as a CRT or the like.

When a radiation energy such as X-rays, α-rays, γ-rays, electron beams, ultraviolet radiation, or the like is applied to a certain phosphor, it stores part of the applied radiation energy. When stimulating light such as visible light is subsequently applied to the phosphor, the phosphor emits light depending the stored radiation energy. Such a phosphor is referred to as a stimulable phosphor. A stimulable phosphor is usually used in the form of a sheet which is referred to as a stimulable phosphor sheet.

The above known system comprises a built-in image information reading apparatus which includes a recording section for temporarily recording radiation image information of a subject on a stimulable phosphor sheet, a reading section for photoelectrically reading the radiation image information recorded on the stimulable phosphor sheet by applying simulating light to the stimulable phosphor sheet, and an erasing section for erasing remaining radiation image information from the stimulable phosphor sheet after the recorded image information has been read, the stimulable phosphor sheet being circulated or moved back and forth in the apparatus. The known system also comprises an image information reading apparatus which includes a cassette loading section for loading a cassette which houses a stimulable phosphor sheet which bears recorded radiation image information of a subject, a reading section for reading the radiation image information from the stimulable phosphor sheet that has been removed from the cassette, and an erasing section for erasing remaining radiation image information from the stimulable phosphor sheet.

Figure 9:
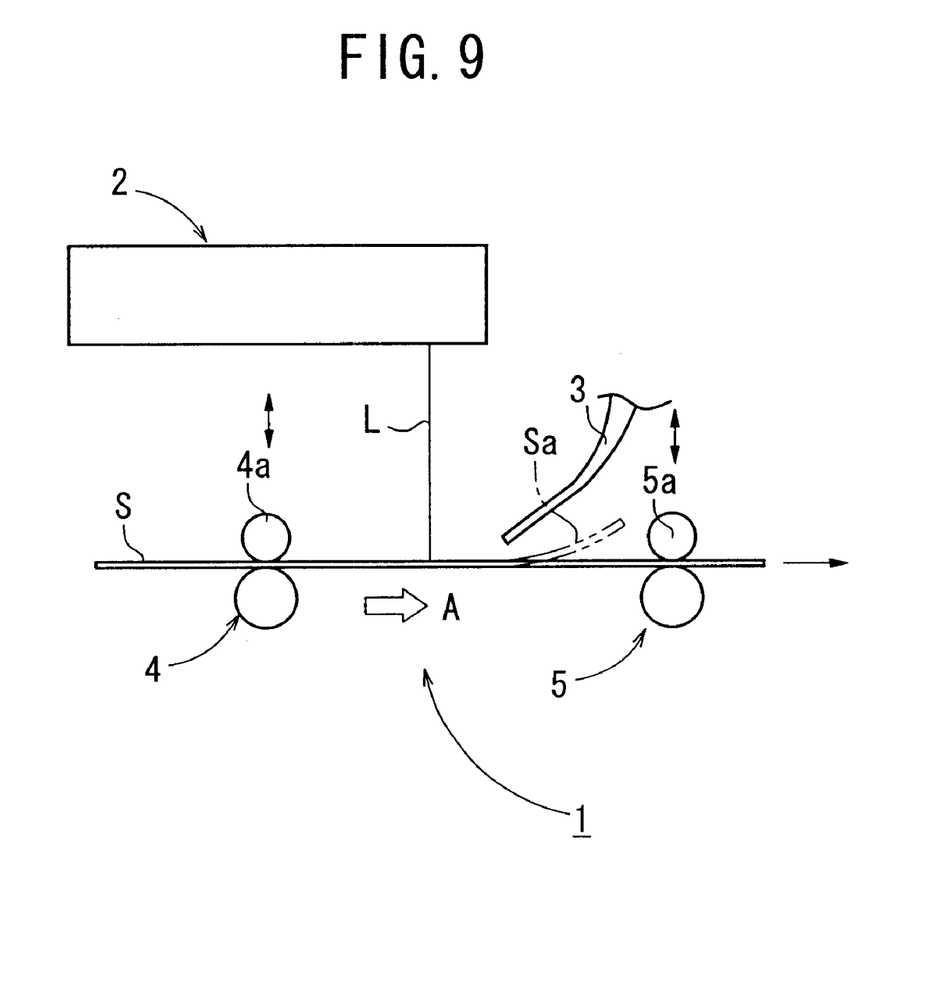
FIG. 9 is a schematic side elevational view of a conventional reading section.

As shown in FIG. 9 of the accompanying drawings, the reading section of the image information reading apparatus comprises an auxiliary scanning feed system 1 for feeding a stimulable phosphor sheet S in an auxiliary scanning direction indicated by the arrow A, an optical system 2 for applying a laser beam L in a main scanning direction, which is perpendicular to the auxiliary scanning direction, to the stimulable phosphor sheet S that is being fed in the auxiliary scanning direction, and a light collecting system 3 for photoelectrically reading light which is emitted from the stimulable phosphor sheet S by the application of the laser beam L. The auxiliary scanning feed system 1 usually has first and second roller pairs 4, 5 spaced from each other by a given distance. The first and second roller pairs 4, 5 have respective nip rollers 4a, 5a that are movable back and forth in the directions indicated by the arrows.

In the auxiliary scanning feed system 1, a leading end of the stimulable phosphor sheet S is first fed by the roller pair 4 in the auxiliary scanning direction indicated by the arrow A, and the laser beam L emitted from the optical system 2 is applied in the main scanning direction to the stimulable phosphor sheet S. When the leading end of the stimulable phosphor sheet S approaches the roller pair 5, the nip roller 5a is displaced to cause the roller pair 5 to gently grip the leading end of the stimulable phosphor sheet S.

If the leading end of the stimulable phosphor sheet S is curled as indicated by Sa, then the curled leading end Sa cannot smoothly enter between the rollers of the roller pair 5. As a result, the radiation image information cannot efficiently be read from the stimulable phosphor sheet S.

For reducing the size of the image information reading apparatus, the stimulable phosphor sheet S may be fed vertically in the auxiliary scanning direction. When the stimulable phosphor sheet S is fed vertically, however, the read image tend to suffer unwanted irregularities because the stimulable phosphor sheet S that is fed vertically is liable to flutter.

SUMMARY OF THE INVENTION

It is a main object of the present invention to provide an apparatus for scanning a sheet-like recording medium highly accurately and efficiently while reliably feeding the sheet-like recording medium in an auxiliary scanning direction with a simple arrangement.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
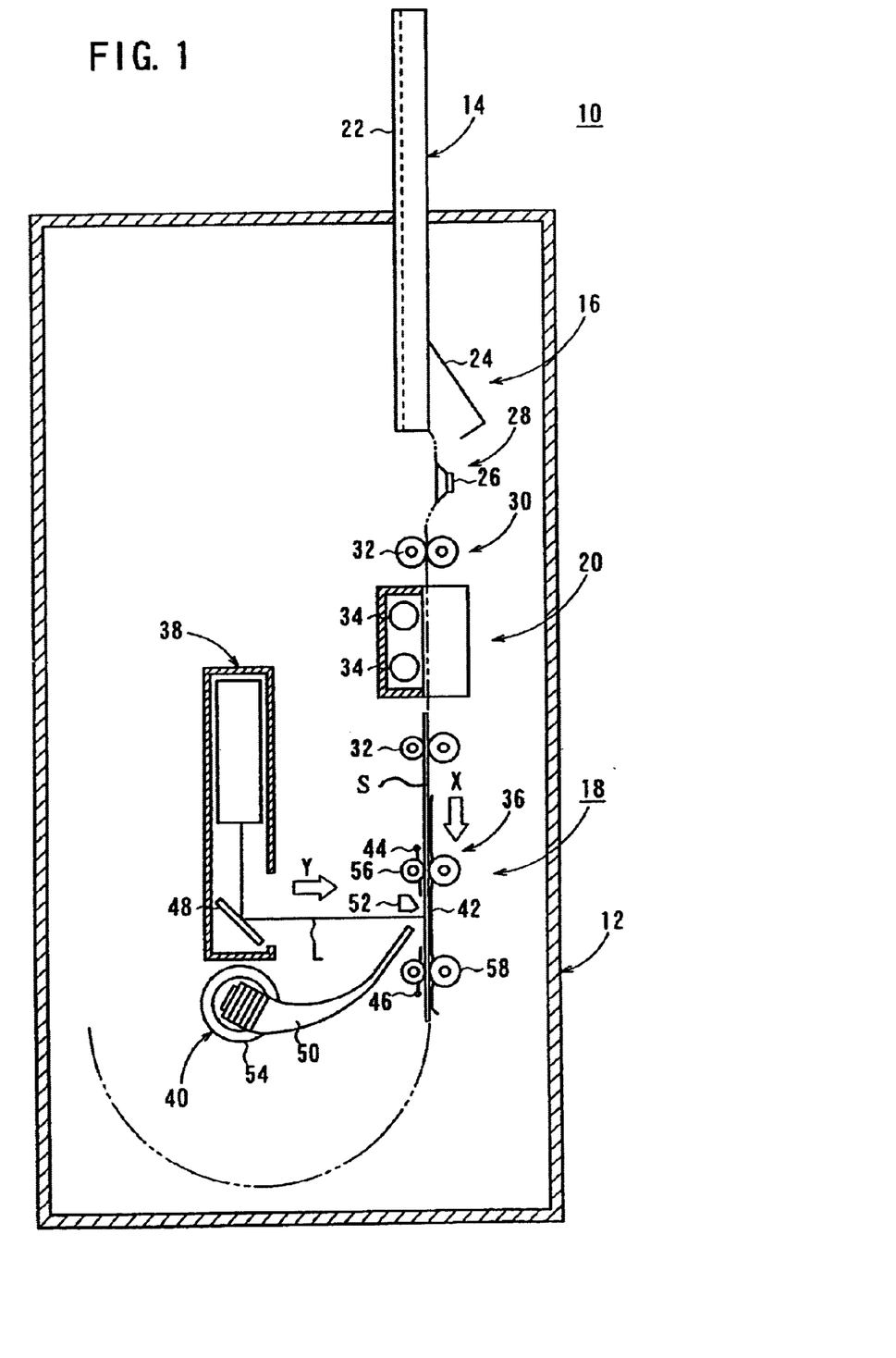
FIG. 1 is a schematic vertical cross-sectional view of an image information reading apparatus which incorporates a scanning apparatus according to a first embodiment of the present invention.

FIG. 1 shows in schematic vertical cross section an internal structure of an image information reading apparatus 10 which incorporates an apparatus for scanning a sheet-like recording medium according to a first embodiment of the present invention.

As shown in FIG. 1, the image information reading apparatus 10 has an apparatus housing 12 which houses a cassette loading unit 16 for loading a cassette 14 which houses a stimulable phosphor sheet (sheet-like recording medium) S which bears recorded radiation image information of a subject, a reading unit (scanning apparatus) 18 for photoelectrically reading the recorded radiation image information from the stimulable phosphor sheet S by applying a laser beam L as simulating light to the stimulable phosphor sheet S, and an erasing unit 20 for erasing remaining radiation image information from the stimulable phosphor sheet S after the recorded image information has been read.

The cassette 14 comprises a casing 22 for housing the stimulable phosphor sheet S therein, and a lid 24 openably and closably mounted on an end of the casing 22 for removing the stimulable phosphor sheet S from and inserting the stimulable phosphor sheet S into the casing 22. The cassette loading unit 16 receives the cassette 14 inserted vertically therein. The cassette loading unit 16 has a lid opening/closing means (not shown) for opening and closing the lid 24, and a sheet feed means 28 having a suction cup 26 for attracting and removing the stimulable phosphor sheet S from the cassette 14 and inserting the stimulable phosphor sheet S, from which desired image information has been read and remaining image information has been erased, into the cassette 14.

A feeder 30 for gripping and vertically feeding the stimulable phosphor sheet S is disposed below the sheet feed means 28. The feeder 30 has feed rollers 32 positioned in the vicinity of the erasing unit 20. The erasing unit 20 comprises a plurality of horizontal erasing light sources 34. Alternatively, the erasing unit 20 comprises a single erasing light source, and the erasing light source or sources may extend vertically.

The reading unit 18 comprises an auxiliary scanning feed means 36 for feeding the stimulable phosphor sheet S in an auxiliary scanning direction which is a vertically downward direction indicated by the arrow X, a laser beam applying means (scanning light applying means) 38 for applying a laser beam L as scanning light to the stimulable phosphor sheet S being fed in the auxiliary scanning direction, in a main scanning direction which is substantially a horizontal direction indicated by the arrow Y, a reading means 40 for collecting light emitted from the stimulable phosphor sheet S and photoelectrically reading the recorded radiation image information from the stimulable phosphor sheet S, a fixed guide means 42 disposed near the position where the stimulable phosphor sheet S is irradiated by the laser beam L, for holding one surface of the stimulable phosphor sheet S that is opposite to the surface thereof to which the laser beam L is applied, and first and second movable guide means 44, 46 positioned on the side of the irradiated surface of the stimulable phosphor sheet S respectively upstream and downstream of the position where the stimulable phosphor sheet S is irradiated by the laser beam L, the first and second movable guide means 44, 46 being movable toward and away from the stimulable phosphor sheet S.

The laser beam applying means 38 has an optical system 48 which directs the laser beam L that is emitted vertically downwardly to travel substantially horizontally so as to be applied to the stimulable phosphor sheet S. A light guide 50 and a reflecting mirror 52 for collecting light emitted from the stimulable phosphor sheet S upon application of the laser beam L are disposed in the vicinity of the position where the stimulable phosphor sheet S is irradiated by the laser beam L. The light guide 50 is connected to a photomultiplier 54, thus making up the reading means 40.

Figure 2:
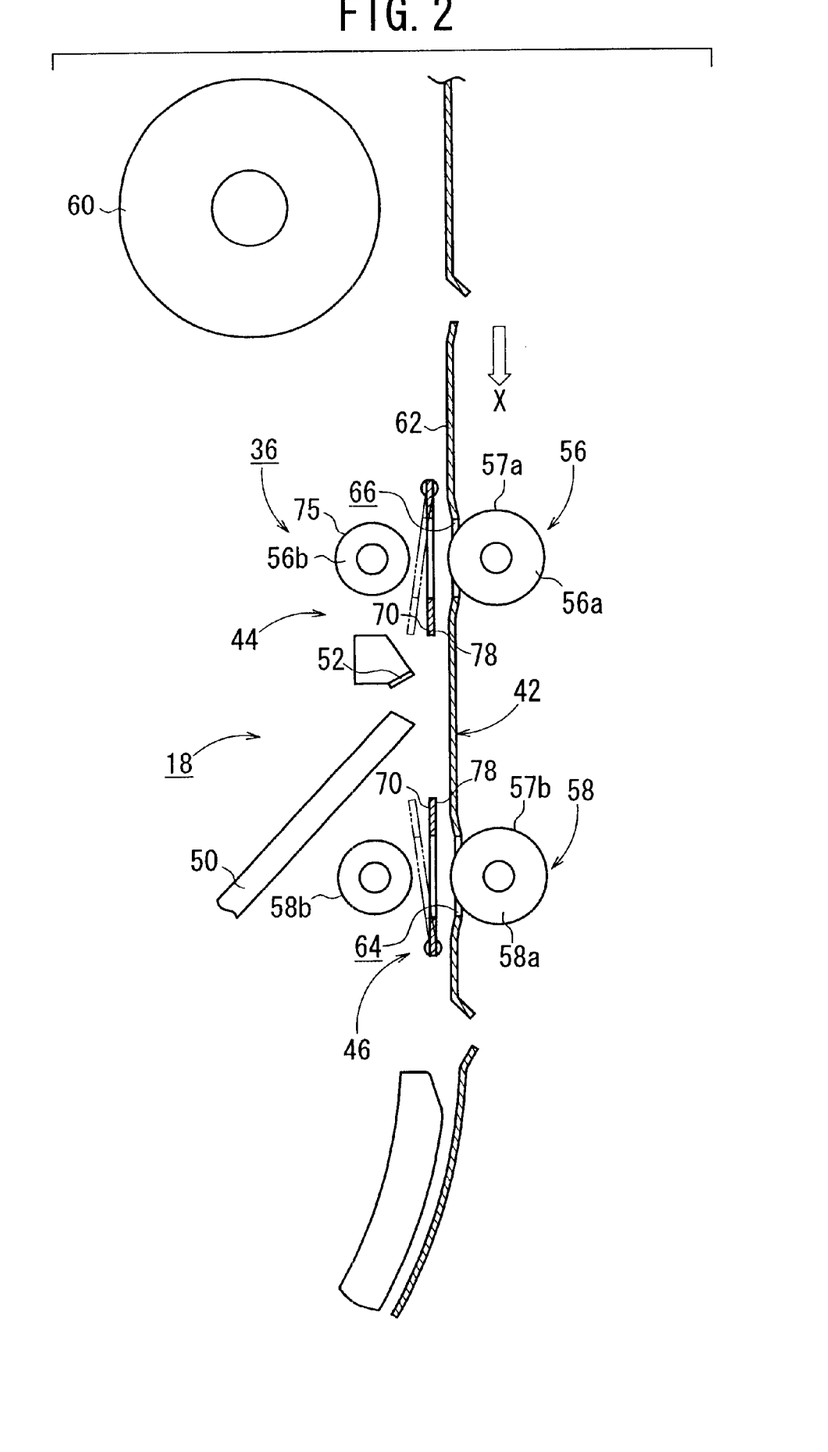
FIG. 2 is a schematic vertical cross-sectional view of a reading section of the image information reading apparatus.

As shown in FIG. 2, the auxiliary scanning feed means 36 has first and second roller pairs 56, 58 spaced from each other by a given distance in the vertical direction indicated by the arrow X. The first and second roller pairs 56, 58 have respective drive rollers 56a, 58a synchronously rotatable by a transmitting means (not shown) such as a belt and pulley means operatively coupled to a motor 60, and respective nip rollers 56b, 58b movable toward and away from the drive rollers 56a, 58a, respectively.

Figure 3:
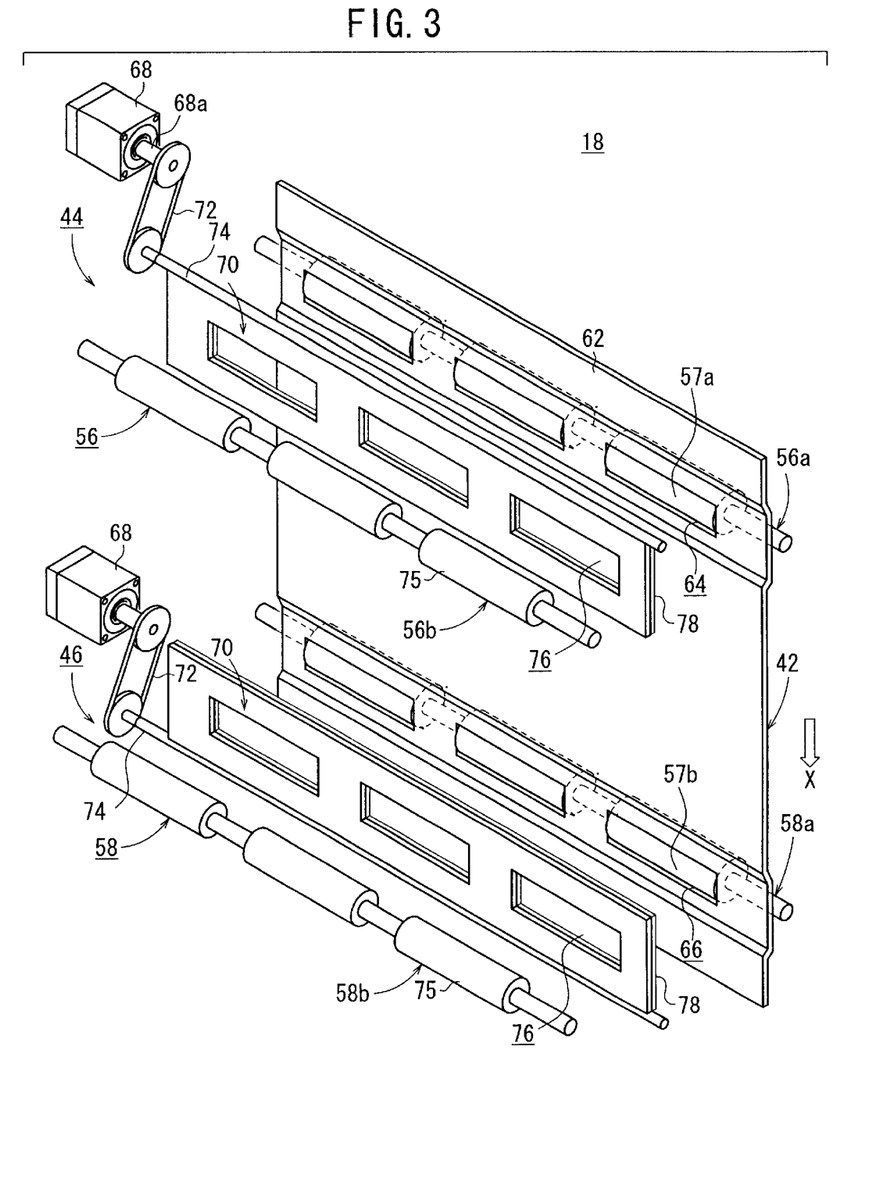
FIG. 3 is a perspective view of the reading section.

As shown in FIGS. 2 and 3, the fixed guide means 42 has a guide plate 62 extending vertically in the direction indicated by the arrow X from a position upstream of the first roller pair 56 to a position downstream of the second roller pair 58. The guide plate 62 has a plurality of openings 64, 66 defined therein which receive roller surfaces 57a, 57b of the drive rollers 56a, 58a.

The first and second movable guide means 44, 46 are disposed between the rollers of the first and second roller pairs 56, 58. As shown in FIG. 3, the first movable guide means 44 has a swing plate 70 that is swingable by an actuator, e.g., a servomotor 68. The servomotor 68 has a drive shaft 68a to which an end of a rotatable shaft 74 is operatively connected by a belt and pulley means 72. The swing plate 70 has a horizontal edge fixedly joined to the rotatable shaft 74. The swing plate 70 is elongate in the axial direction of the nip roller 56b and has a plurality of openings 76 defined therein for receiving respective roller surfaces 75 of the nip roller 56b.

A damping pad 78 made of nonwoven fabric, woven fabric of polyester, or the like is attached to a surface of the swing plate 70 which is to be held against the stimulable phosphor sheet S.

The second movable guide means 46 is identical in structure to the first movable guide means 44. Those parts of the second movable guide means 46 which are identical to those of the first movable guide means 44 are denoted by identical reference characters, and will not be described in detail below.

Operation of the image information reading apparatus 10 will be described below.

The cassette 14 which is vertically oriented is inserted into the cassette loading unit 16 which is disposed in an upper portion of the apparatus housing 12. The cassette 14 houses therein the stimulable phosphor sheet S which records thereon radiation image information of a subject. The lid 24 of the cassette 14 is opened by the lid opening/closing means (not shown) of the cassette loading unit 16.

Then, the suction cup 26 of the sheet feed means 28 is displaced into the casing 22, attracts the stimulable phosphor sheet S, and removes the stimulable phosphor sheet S from the casing 22. When the leading end of the stimulable phosphor sheet S is gripped by the feed rollers 32 of the feeder 30, the stimulable phosphor sheet S is delivered through the erasing unit 20 to the auxiliary scanning feed means 36 of the reading unit 18 upon rotation of the feed rollers 32.

In the reading unit 18, the swing plates 70 of the first and second movable guide means 44, 46 are positioned away from the fixed guide means 42, and the drive rollers 56a, 58b are rotated by the motor 60 of the auxiliary scanning feed means 36. Therefore, the stimulable phosphor sheet S is gripped by the drive roller 56a and the nip roller 56b of the first roller pair 56, and fed in the auxiliary scanning direction which is the vertically downward direction indicated by the arrow X.

As shown in FIG. 3, the servomotor 68 of the first movable guide means 44 is actuated to cause the belt and pulley means 72 to turn the rotatable shaft 74 a predetermined angle. The swing plate 70 fixed to the rotatable shaft 74 is now angularly moved toward the fixed guide means 42. The swing plate 70 and the guide plate 62 of the fixed guide means 42 jointly hold the stimulable phosphor sheet S therebetween.

Figure 4:
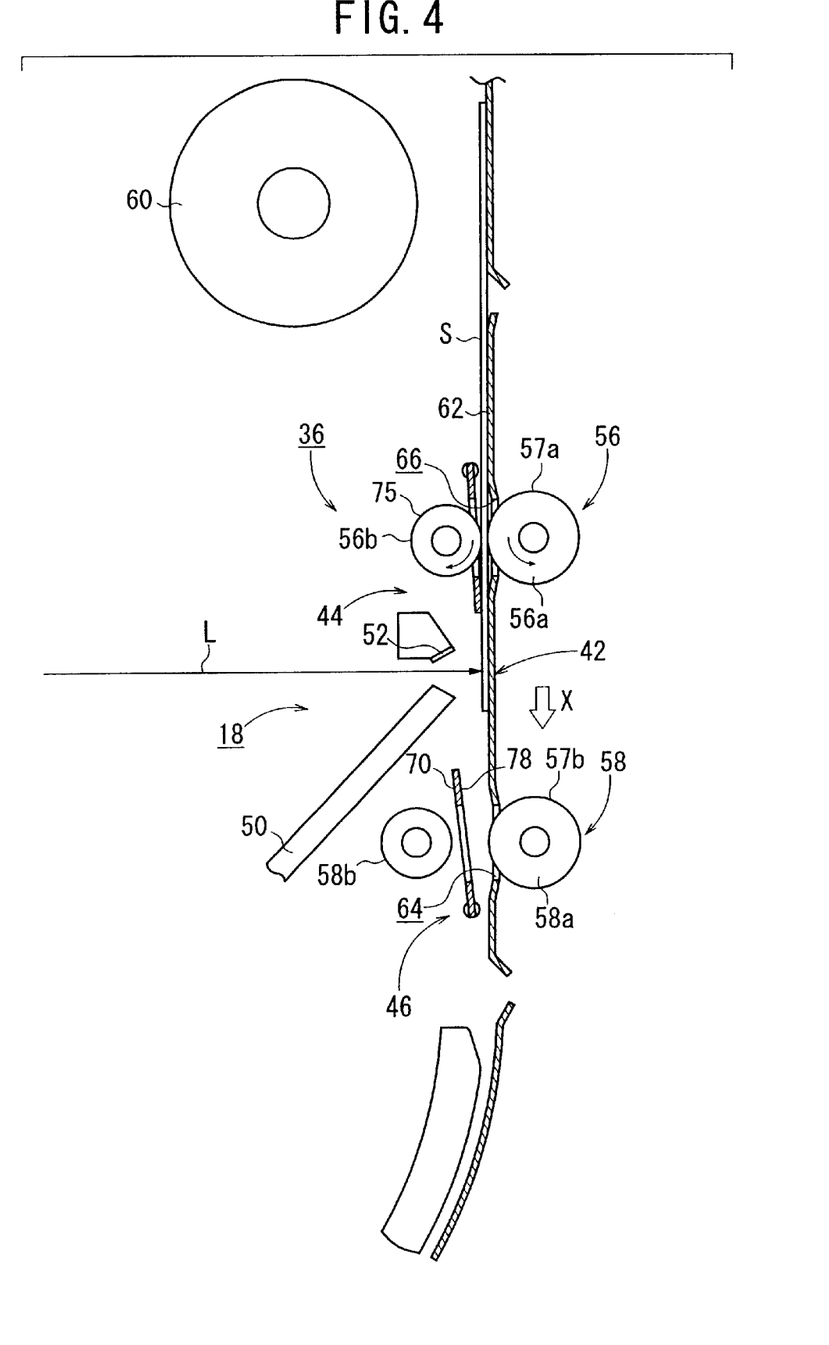
FIG. 4 is a schematic vertical cross-sectional view showing the manner in which the reading section starts to read a stimulable phosphor sheet.

The stimulable phosphor sheet S is fed in the auxiliary scanning direction indicated by the arrow X by the first roller pair 56, the fixed guide means 42, and the first movable guide means 44, while at the same time the laser beam applying means 38 emits the laser beam L. The laser beam L first travels vertically downwardly, and is then directed substantially horizontally as indicated by the arrow Y by the optical system 48. The laser beam L is applied to the recording surface of the stimulable phosphor sheet S to scan the same in the main scanning direction (see FIG. 4). Upon application of the laser beam L, the stimulable phosphor sheet S emits light, which is photoelectrically read by the photomultiplier 54 directly or via the reflecting mirror 52 and the light guide 50.

Figure 5:
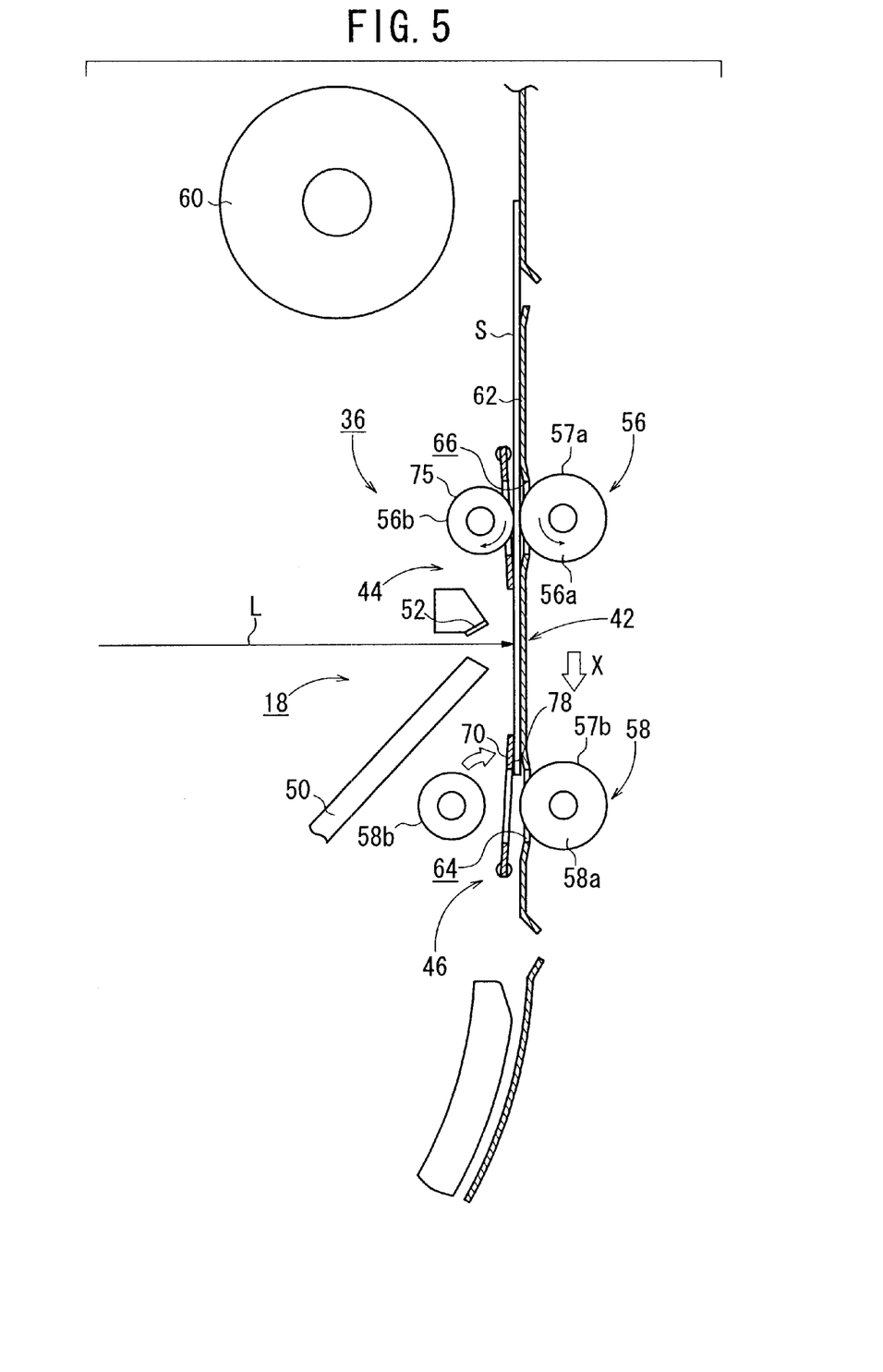
FIG. 5 is a schematic vertical cross-sectional view showing the manner in which the stimulable phosphor sheet is held by first and second movable guide means.

When the leading end of the stimulable phosphor sheet S is inserted between the fixed guide means 42 and the second movable guide means 46, the servomotor 68 of the second movable guide means 46 is energized to cause the belt and pulley means 72 to swing the swing plate 70 at a relatively low speed toward the stimulable phosphor sheet S until the swing plate 70 holds the recording surface of the stimulable phosphor sheet S (see FIG. 5). When the leading end of the stimulable phosphor sheet S is inserted between the drive roller 58a and the nip roller 58b of the second roller pair 58, the nip roller 58b moves at a relatively low speed to the drive roller 58a. The stimulable phosphor sheet S is now fed in the auxiliary scanning direction indicated by the arrow X by the second roller pair 58.

Figure 6:
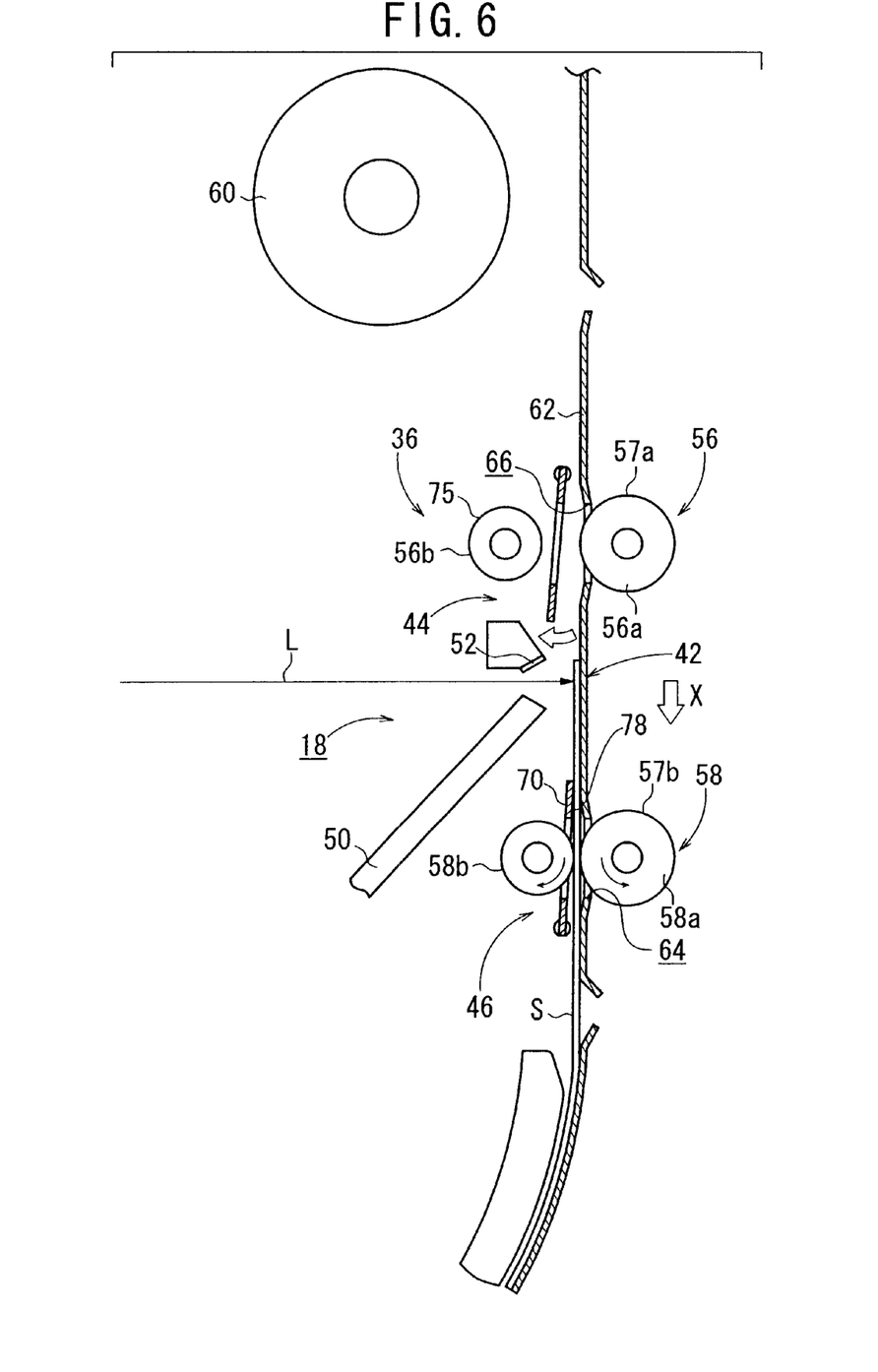
FIG. 6 is a schematic vertical cross-sectional view showing the manner in which the stimulable phosphor sheet is released from the first movable guide means.

The stimulable phosphor sheet S is fed in the auxiliary scanning direction by the first and second roller pairs 56, 58. When the trailing end of the stimulable phosphor sheet S leaves the first roller pair 56, the nip roller 56b is displaced away from the drive roller 56a, and, as shown in FIG. 6, the swing plate 70 of the first movable guide means 44 is slowly displaced away from the guide plate 62.

In the reading unit 18 according to the first embodiment, the first and second movable guide means 44, 46 are disposed between the rollers of the first and second roller pairs 56, 58, and both surfaces of the stimulable phosphor sheet S being fed in the auxiliary scanning direction are held across its full width by the fixed guide means 42 and the first and second movable guide means 44, 46. The stimulable phosphor sheet S that is being fed vertically downwardly in the auxiliary scanning direction is thus prevented from fluttering, so that the radiation image information carried by the stimulable phosphor sheet S can be read highly accurately and reliably.

The second movable guide means 46 is initially spaced from the fixed guide means 42. When the leading end of the stimulable phosphor sheet S is fed in the second movable guide means 46, the swing plate 70 thereof is slowly swung toward the guide plate 62 to hold the leading end of the stimulable phosphor sheet S. When the trailing end of the stimulable phosphor sheet S is released from between the first movable guide means 44 and the fixed guide means 42, the swing plate 70 of the first movable guide means 44 is slowly displaced away from the guide plate 62.

Therefore, when the stimulable phosphor sheet S enters and leaves the first and second movable guide means 44, 46, the stimulable phosphor sheet S is not subjected to shocks. As a result, the stimulable phosphor sheet S enters and leaves the first and second movable guide means 44, 46 smoothly. The stimulable phosphor sheet S can thus be fed highly accurately in the auxiliary scanning direction, so that the radiation image information carried by the stimulable phosphor sheet S can be read highly accurately and efficiently without the danger of image irregularities involved in the read radiation image information. Even if the radiation image information is recorded fully in the recording surface of the stimulable phosphor sheet S, the recorded radiation image information can be read reliably without fail.

The swing plates 70 of the first and second movable guide means 44, 46 have the respective damping pads 78 for protecting the recording surface of the stimulable phosphor sheet S against damage. Since the stimulable phosphor sheet S is fed vertically in the auxiliary scanning direction, the image information reading apparatus 10 takes up a greatly reduced installation area, allowing a surrounding facility installation space to be efficiently utilized.

After the radiation image information has been read from the stimulable phosphor sheet S, the stimulable phosphor sheet S is fed back upwardly to the erasing unit 20 by the auxiliary scanning feed means 36 that is reversed in rotation. In the erasing unit 20, the erasing light sources 34 are energized to erase remaining radiation image information from the stimulable phosphor sheet S. After the remaining radiation image information has been erased from the stimulable phosphor sheet S, the stimulable phosphor sheet S is attracted by the suction cup 26 of the sheet feed means 28, and inserted into the casing 22 of the cassette 14. The lid 24 is closed, and the cassette 14 is removed from the cassette loading unit 16.

Figure 7:
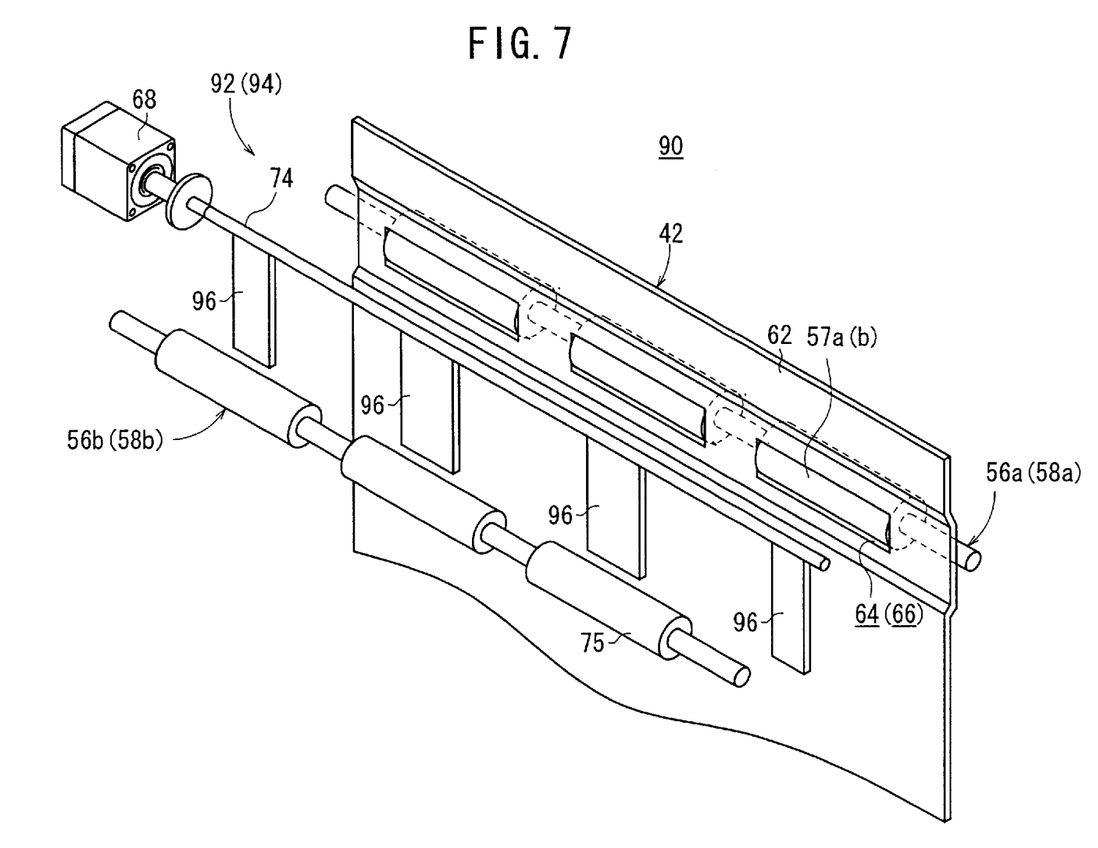
FIG. 7 is a perspective view of a reading section as a scanning apparatus according to a second embodiment of the present invention.

FIG. 7 shows in perspective a reading unit 90 according to a second embodiment of the present invention. Those parts of the reading unit 90 which are identical to those of the reading unit 18 according to the first embodiment are denoted by identical reference characters, and will not be described in detail below.

As shown in FIG. 7, the reading unit 90 has first and second movable guide means 92, 94 each having a plurality of swing plates 96 fixed endwise to the rotatable shaft 74. The swing plates 96 are positioned in alignment with respective gaps between the roller surfaces 75 of the nip rollers 56b, 58b, and swingable toward and away from the guide plate 62.

In the reading unit 90, the swing plates 96 of the first and second movable guide means 92, 94 serve to hold the recording surface of the stimulable phosphor sheet S that is being fed in the auxiliary scanning direction, whereas the opposite surface of the stimulable phosphor sheet S is held by the guide plate 62. The stimulable phosphor sheet S thus held by the swing plates 96 and the guide plate 62 is prevented from fluttering when the stimulable phosphor sheet S is fed vertically.

When the stimulable phosphor sheet S enters and leaves the first and second movable guide means 92, 94, the swing plates 96 are displaced slowly into and out of contact with the stimulable phosphor sheet S, which is thus free of shocks. Consequently, the radiation image information recorded on the stimulable phosphor sheet S can be read highly accurately and efficiently. Therefore, the reading unit 90 according to the second embodiment offers the same advantages as the reading unit 18 according to the first embodiment.

Figure 8:
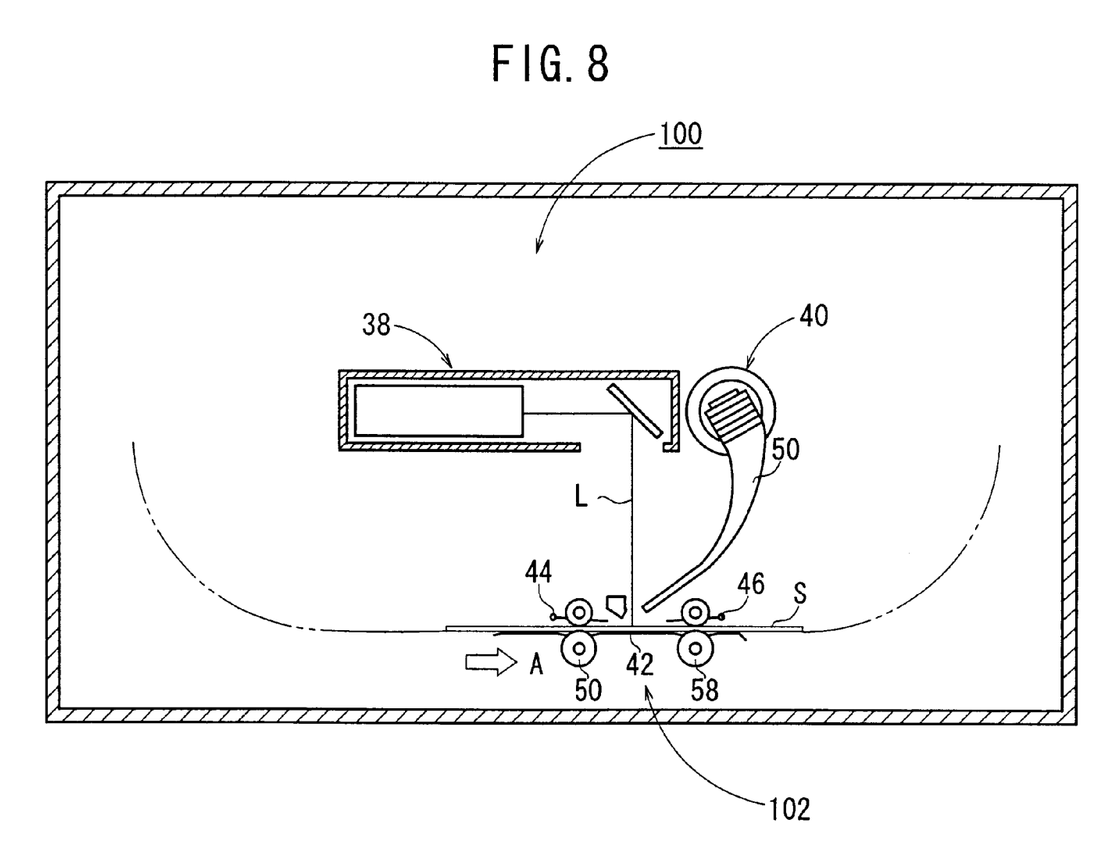
FIG. 8 is a schematic cross-sectional view of a reading section as a scanning apparatus according to a third embodiment of the present invention.

FIG. 8 shows in cross section a reading unit 100 according to a third embodiment of the present invention. Those parts of the reading unit 100 which are identical to those of the reading unit 18 according to the first embodiment are denoted by identical reference characters, and will not be described in detail below.

As shown in FIG. 8, the reading unit 100 comprises an auxiliary scanning feed means 102 for feeding the stimulable phosphor sheet S in the auxiliary scanning direction which is a horizontal direction indicated by the arrow A. The auxiliary scanning feed means 102 comprises first and second roller pairs 56, 58 and first and second movable guide means 44, 46 disposed between the rollers of the first and second roller pairs 56, 58.

When the stimulable phosphor sheet S is fed horizontally in the auxiliary scanning direction by the auxiliary scanning feed means 102, upper and lower surfaces of the stimulable phosphor sheet S are held by the fixed guide means 42 and the first and second movable guide means 44, 46.

Consequently, even if the stimulable phosphor sheet S is curled, the stimulable phosphor sheet S can reliably held in a horizontal attitude, and can be fed highly accurately in the auxiliary scanning direction by the first and second roller pairs 56, 58. The radiation image information carried by the stimulable phosphor sheet S can thus be read highly accurately and efficiently. Therefore, the reading unit 100 according to the third embodiment offers the same advantages as the reading units 18, 90 according to the first and second embodiments.

In the first through third embodiments, the stimulable phosphor sheet S has been used as a sheet-like recording medium. However, the stimulable phosphor sheet S may be replaced with a photographic film with an image recorded thereon.

In the apparatus for scanning a sheet-like recording medium according to the present invention, as described above, one surface of the sheet-like recording medium is held by the fixed guide means in the vicinity of the position where the sheet-like recording medium is irradiated by scanning light, and the other surface of the sheet-like recording medium is held by the first and second movable guide means. The sheet-like recording medium thus held is reliably prevented from fluttering and being curled. The radiation image information recorded on the sheet-like recording medium can therefore be scanned and read highly accurately and efficiently without the danger of image irregularities involved in the read radiation image information.

Although certain preferred embodiments of the present invention have been shown and described in detail, it should be understood that various changes and modifications may be made therein without departing from the scope of the appended claims.

What is claimed is:

1. An apparatus for scanning a sheet-like recording medium, comprising:
   auxiliary scanning feed means for feeding a sheet-like recording medium in an auxiliary scanning direction;
   scanning light applying means for applying scanning light to said sheet-like recording medium in a main scanning direction which is substantially perpendicular to said auxiliary scanning direction;
   fixed guide means disposed near a position where said sheet-like recording medium is irradiated by said scanning light, for holding one surface of said sheet-like recording medium; and
   first and second movable guide means, positioned on the side of an opposite surface of said sheet-like recording medium respectively upstream and downstream of the position where said sheet-like recording medium is irradiated by said scanning light, for holding an opposite surface of said sheet-like recording medium, said first and second movable guide means, being movable toward and away from said sheet-like recording medium.

2. An apparatus according to claim 1, wherein said first and second movable guide means, are disposed on the side of the surface of said sheet-like recording medium which is irradiated by said scanning light, each of said first and second movable guide means having a damping pad on a surface thereof for contacting said sheet-like recording medium.

3. An apparatus according to claim 1, wherein said first and second movable guide means have respective actuators and respective swing plates angularly movable by said actuators.

4. An apparatus according to claim 1, wherein said auxiliary scanning feed means has first and second roller pairs spaced from each other by a predetermined distance, said first and second movable guide means being positioned between rollers of said first and second roller pairs.

5. An apparatus according to claim 4, wherein said first and second movable guide means have respective actuators and respective swing plates angularly movable by said actuators.

6. An apparatus according to claim 5, wherein said fixed guide means has a plurality of openings for receiving respective roller surfaces of said first and second roller pairs, and said swing plate has a plurality of openings for receiving respective roller surfaces of said first and second roller pairs.

7. An apparatus according to claim 5, wherein said fixed guide means has a plurality of openings for receiving respective roller surfaces of said first and second roller pairs, and said swing plate comprises a plurality of swing plates in alignment with respective gaps between the roller surfaces of said first and second roller pairs.

8. An apparatus according to claim 1, wherein said auxiliary scanning feed means comprises means for feeding said sheet-like recording medium vertically in said auxiliary scanning direction.

9. An apparatus according to claim 1, wherein said first and second movable guide means are movable toward and away from said sheet-like recording medium independently of each other.

10. An apparatus for scanning a sheet-like recording medium, comprising:
    an auxiliary scanning feeder, said feeder feeding a sheet-like recording medium in an auxiliary scanning direction;
    a scanning light scanning said sheet-like recording medium in a main scanning direction which is substantially perpendicular to said auxiliary scanning direction;
    a fixed guide disposed near a position where said sheet-like recording medium is scanned by said scanning light, said guide holding one surface of said sheet-like recording medium; and
    first and second movable guides positioned on the side of an opposite surface of said sheet-like recording medium respectively upstream and downstream of the position where said sheet-like recording medium is scanned by said scanning light, said first and second movable guides holding an opposite surface of said sheet-like recording medium, said first and second movably guides movable toward and away from said sheet-like recording medium.

11. An apparatus according to claim 10, wherein said first and second movable guide means are movable toward and away from said sheet-like recording medium independently of each other.

12. An apparatus for scanning a sheet-like recording medium, comprising:

auxiliary scanning feed means for feeding a sheet-like recording medium in an auxiliary scanning direction;

scanning light applying means for applying scanning light to said sheet-like recording medium in a main scanning direction which is substantially perpendicular to said auxiliary scanning direction;

fixed guide means disposed near a position where said sheet-like recording medium is irradiated by said scanning light, for holding said sheet-like recording medium; and first and second movable guide means positioned respectively upstream and downstream of the position where said sheet-like recording medium is irradiated by said scanning light, for holding said sheet-like recording medium, said first and second movable guide means being movable toward and away from said sheet-like recording medium.

* * * * *